United States Patent [19]
Corn et al.

[11] 3,880,939
[45] Apr. 29, 1975

[54] CONTINUOUS PROCESS FOR THE PRODUCTION OF A DIOL FROM A DIOL ESTER

[75] Inventors: John E. Corn, Schenectady; Jimmy L. Webb, Ballston Lake; R. Thomas Swiger, Schenectady, all of N.Y.

[73] Assignee: General Electric Company, Pittsfield, Mass.

[22] Filed: May 30, 1973

[21] Appl. No.: 365,239

[52] U.S. Cl. .............. 260/635 R; 23/283; 260/491; 260/541; 260/638 R
[51] Int. Cl. ...................... C07c 27/00; C07c 31/20
[58] Field of Search ...................... 260/635 R, 491

[56] References Cited
UNITED STATES PATENTS

| | | | |
|---|---|---|---|
| 1,454,604 | 5/1923 | Rodebush | 260/635 R |
| 1,491,076 | 4/1924 | Burghart | 260/491 |
| 2,862,962 | 12/1958 | Ulvild et al. | 260/491 |
| 3,239,569 | 3/1966 | Slaugh et al. | 260/491 |
| 3,647,892 | 3/1972 | Hoch | 260/635 R |

*Primary Examiner*—Joseph E. Evans
*Attorney, Agent, or Firm*—William F. Mufatti; Donald M. Papuga

[57] ABSTRACT

A continuous process for the production of a diol from a diol ester by alcoholysis, which comprises feeding the ester and an alcohol into a reactor containing an acidic cationic exchange material at elevated temperature and continuously removing the diol from the reactor.

8 Claims, 1 Drawing Figure

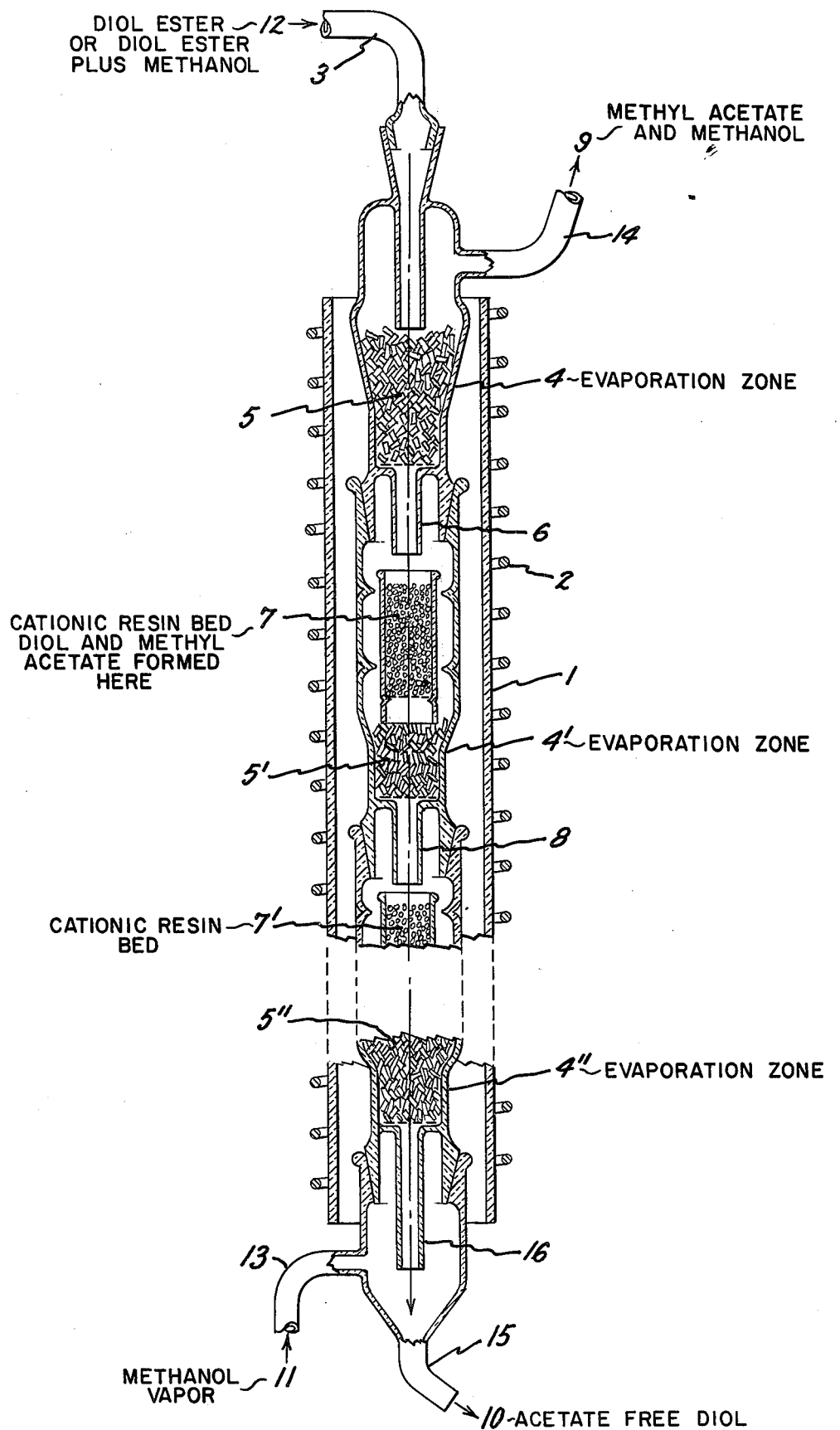

CONTINUOUS PROCESS FOR THE PRODUCTION OF A DIOL FROM A DIOL ESTER

This invention relates to a continuous process for the production of an ester-free diol from a diol ester by alcoholysis, which comprises feeding the ester and an alcohol with a boiling point lower than the diol into a reactor containing an acidic cationic exchange material at a temperature sufficient to volatilize the starting alcohol and its corresponding ester and continually removing the ester-free diol and a mixture of the starting alcohol and an ester whose boiling point is lower than that of the diol ester from the reactor.

BACKGROUND OF THE INVENTION

There are several methods for removal of ester groups from diols to produce the useful diol. Aqueous base hydrolysis is unacceptable in that molar quantities of carboxylic acid salts are produced which are soluble in water and somewhat soluble in the product diols. The isolated salt must then be converted to the carboxylic acid for recycle by strong acid, thus producing large quantities of useless salts.

In acid catalyzed hydrolysis, when an ester, water and an acid catalyst are mixed, an equilibrium is established which has a large amount of ester remaining in the mixture. Methods must be devised to shift the equilibrium in the desired direction, usually by removing one or more of the products selectively from the reaction mixture.

DESCRIPTION OF THE INVENTION

It has been discovered that ester groups may be removed from diol esters by a continuous process by alcoholysis in the presence of an acidic ion exchange resin.

The instant invention concerns a continuous process for the production of an ester-free diol from a diol ester by alcoholysis in the presence of an acidic cationic exchange material which comprises continually feeding said diol ester and an alcohol vapor into a reactor, passing said feed materials countercurrently in the reactor, contacting the diol ester and alcohol vapor in the reactor, then flowing the mixture of diol ester and alcohol through an acidic cationic exchange material in a reaction zone at elevated temperature, then contacting the reaction mixture with additional alcohol vapor thereby removing an ester whose boiling point is lower than the diol ester, then flowing the mixture through an acidic cationic exchange material in a reaction zone, repeating the steps of contacting the reaction mixture with additional alcohol vapor and flowing the mixture through an acidic cationic exchange material and then continually removing the ester-free diol and a mixture of starting alcohol and an ester whose boiling point is lower than that of the diol ester from the reactor.

Preferably, a diol ester is fed into a reactor in the presence of an acidic cationic exchange resin from the upper part of said reactor and methanol vapor from the lower part of said reactor, passing said feed materials countercurrently in the reactor, contacting the diol ester and methanol vapor in the reactor, then flowing the mixture of diol ester and methanol through an acidic cationic exchange resin in a reaction zone at elevated temperature, then contacting the reaction mixture with additional methanol vapor thereby removing an ester whose boiling point is lower than the diol ester, then flowing the mixture through an acidic cationic exchange resin in a reaction zone, repeating the steps of contacting the reaction mixture with additional methanol vapor and flowing the mixture through an acidic cationic exchange resin and then continually removing the ester-free diol from the lower part of the reactor and a mixture of methanol and an ester whose boiling point is lower than that of the diol ester from the upper part of the reactor.

The term a diol ester herein includes both a single diol ester and also a mixture of diol esters.

The method of this invention is applicable for continuously removing an ester group from a diol ester. This method may be used to continuously remove an acetate group from a diol acetate derived from the hydroformylation and hydrogenation of allyl acetate.

The hydroformylation and hydrogenation of allyl acetate is disclosed in copending applications Ser. Nos. 365,228 and 365,231 each filed May 30, 1973, titled A Process for the Production of Butanediol and assigned to the same assignee as the present invention. An acetate ester of a butanediol and an acetate ester of a propanediol formed by the hydroformylation and subsequent hydrogenation or by reacting allyl acetate with carbon monoxide and a catalyst at an elevated temperature and pressure may comprise in admixture at least nine compounds, i.e., the diol, the monoacetate, and the diacetate of 1,4-butanediol, of 1,2-butanediol and of 2-methyl-1,3-propanediol.

This involves an improved process for de-esterifying a mixture comprising an acetate ester of a butanediol and an acetate ester of a propanediol obtained by the hydroformylation and hydrogenation of allyl acetate wherein the improvement comprises continuously feeding said mixture of an acetate ester of a butanediol and an acetate ester of a propanediol into a tower containing an acidic cationic exchange material from the upper part of said tower and methanol vapor from the lower part of said tower, passing the feed materials countercurrently in the tower, contacting the mixture of acetate esters of diols and methanol vapor in the tower, then flowing a mixture comprising acetate esters of diols and methanol through an acidic cationic exchange material in a reaction zone at elevated temperature, then contacting the reaction mixture with additional methanol vapor thereby removing methyl acetate, then flowing the mixture through an acidic cationic exchange material in a reaction zone, repeating the steps of contacting the reaction mixture with additional methanol vapor and flowing the mixture through an acidic cationic exchange material and then continually removing an admixture of diols from the lower part of the tower and a mixture of methanol and methyl acetate from the upper part of the tower.

The term a butanediol herein includes a mixture of isomeric butanediols.

When the continuous process of forming the diols comprises adding methanol with the acetate ester of a butanediol and an acetate ester of a propanediol through an acidic cationic exchange material in a reactor, the product comprises in admixture several diols, i.e., 1,4-butanediol, 1,2-butanediol and 2-methyl-1,3-propanediol. Methanol vapor is passed countercurrently through the reactor and methyl acetate and methanol are removed from the upper part of the reactor. Methyl acetate has a boiling point of 57.3°C, seven centigrade degrees lower than methanol (b.p. 64.7°C), and can be fractionated away from the reaction mixture as its methanol azeotrope (b.p. 53.8°C.) thus driving the reaction to completion. The 1,4-butanediol is separated from the diols by fractional distillation.

The methanol azeotrope may be converted to acetic acid and methanol by methods known in the art, such as hydrolysis.

The alcohol that is the reactant has a lower boiling point than the diol. Preferred alcohols that may be used are the lower alkyl alcohols such as methanol, ethanol, etc.

Any acidic cationic exchange material can be used within the scope of this invention. A preferable acidic cationic exchange material is an acidic cationic exchange resin. A preferred acidic cationic exchange resin comprises a sulfonated resin. A preferred sulfonated resin is a sulfonated polystyrene copolymer insoluble in the reaction medium, such as sulfonated styrene-divinylbenzene copolymer.

The working temperature may be in the range of the temperature necessary to volatilize the alcohol, while the pressure may be in the range from sub-atmospheric to elevated pressures. If methanol is used, the preferred temperature is about 65°C. with atmospheric pressure. If temperatures above 90°C. are used, then excessive amounts of by-products are produced.

The amount of alcohol which may be used in this process may vary from about 1 mole to about 25 moles per mole of diol esters.

A reactor which may be used in this process is a device having liquid passing through an acidic cationic exchange material. Alcohol vapors move countercurrently through the device fractionating the alcohol ester from the reaction mixture and mixing with the diol esters introduced into the reactor.

The reactor which may be used in this process is a device having a down-flow of liquid passing through an acidic cationic exchange resin bed. Methanol vapors move up the column fractionating the methyl acetate from the reaction mixture and mixing the diol acetates introduced at the top of the column.

A multi-stage reactor which comprises in combination: (a) a tower having contained therein a plurality of means for effecting vapor-liquid contact in an evaporation zone and (b) a plurality of means for effecting contact of the resultant material from the evaporation zone with an acidic cationic exchange resin.

The evaporation zones contain therein conventional packings such as stainless steel chips, Raschig rings, saddles, or any of the similar material known to those skilled in the art.

As illustrated in FIG. 1, there is provided a reactor 1 with heating coils 2 around said reactor 1, wherein said reactor 1 has housed therein in axial alignment and in combination, an inlet port 3 which communicates with an evaporation zone 4 containing therein a conventional packing 5, said evaporation zone 4 communicates with an acidic cationic exchange resin bed 7 by discharge pipe 6, wherein said resin bed 7 then communicates with another evaporation zone 4' containing a packing therein 5', which evaporation zone 4' communicates by discharge pipe 8 with another acidic cationic exchange resin bed 7'. The last evaporation zone 4" containing a packing therein 5" is connected by discharge pipe 16 which then communicates with discharge outlet 15. Attached to the reactor 1 are vent outlet 9 and inlet ports 12 and 13.

In operating an embodiment of this invention illustrated in FIG. 1, raw material 12 comprising a diol ester or diol ester mixed with methanol is continuously fed into reactor 1 at the upper part of the reactor. The reaction is maintained at a predetermined temperature by heating coils 2. Methanol vapor 11 is continuously added at the lower end of reactor 1. The methanol vapor 11 flows upward through reactor 1, coming into contact with diol ester 12 in an evaporation zone 4 where they are mixed. The mixture flows down into the acidic cationic exchange resin bed 7 where the methanol and the diol ester react forming a diol and methyl acetate. The reaction mixture flows downwardly into another evaporation zone 4' wherein it is contacted with methanol vapor. Methyl acetate which is formed is passed out along with some methanol at the upper part 9 of the reactor. These steps, i.e., passing through an evaporation zone and an acidic cationic exchange resin bed are repeated until an acetate-free diol is produced which is continuously removed from the lower part 10 of the reactor.

The number of steps, i.e., passing through an evaporation zone and acidic cationic exchange resin bed is dependent upon temperature, flow rates, nature of the acidic cationic exchange material, ester-methanol ratio, etc.

DESCRIPTION OF THE PREFERRED EMBODIMENT

The following Examples are set forth to illustrate more clearly the principle and practice of this invention to those skilled in the art. Unless otherwise specified, where parts or percents are mentioned, they are parts or percents by weight.

EXAMPLE 1

A reactor, similar to that depicted in FIG. 1, is assembled with six stages. A 250 ml. round bottom flask, containing 100 ml. of methanol and a magnetic stirring bar, is attached to the bottom of the reactor. The methanol is refluxed and 19 ml. of diol acetates are pumped into the reactor at 0.33 ml. per minute. The acidic cationic exchange resin is a sulfonated polystyrene copolymer (approximately 8% divinylbenzene), mesh size 16–50, with an exchange capacity of 4.73 meq./g. (dry). Before use the resin is washed several times with anhydrous methanol until the wash solutions are colorless. After the acetates are pumped in, distillate is collected for an additional half hour to ensure complete collection of the methyl acetate and complete flushing of the column. Analysis of the distillate is done by integration of an nmr spectrum. All peaks are cleanly separated and the distillate contained only methanol and methyl acetate as shown in the Table.

EXAMPLE 2

A reactor is assembled as described in Example 1. A 250 ml. round bottom flask, containing 120 ml. of methanol and a magnetic stirring bar, is attached to the bottom of the reactor. The methanol is refluxed and 20 ml. of diol acetates are then pumped into the reactor at 0.33 ml. per minute. The resin is a sulfonated polystyrene copolymer (approximately 8% divinylbenzene), mesh size 16–50, with an exchange capacity of 4.73 meq./g. (Dry). Before use the resin is washed several times with anhydrous methanol until the wash solutions are colorless. After the acetates are pumped in, distillate is collected for an additional half hour to ensure complete collection of the methyl acetate and complete flushing of the column. Analysis of the distillate as in Example 1 showed only methanol and methyl acetate.

The following Table shows the amounts of diol, acetate, methanol, and products formed.

TABLE

| Example | Reactants Amt. of Methanol | Amt. of Acetates | Distillate Analysis Amt. of Distillate | Mole % Methyl Acetate (c) | Composition of Diol Diol | Diol Monoacetate |
|---|---|---|---|---|---|---|
| 1 | 100 ml | 19 ml (a) | 57.2 g | 7.9% | >99.9 | <0.01 |
| 2 | 120 ml | 20 ml (d) | 51.4 g | 8.0% | (b) | (f) |

(a) Composition: 22% 1,4-butanediol, 55% 1,4-butanediol monoacetate, and 16% 1,4-butanediol diacetate.
(b) Composition of product diols: 12% 1,2-butanediol, 13% 2-methyl-1,3-propanediol, and 75% 1,4-butanediol.
(c) Determined by integration of nmr spectrum.
(d) Composition: 1% 1,4-butanediol, 11% 1,2-butanediol monoacetate, 48%, 1,4-butanediol monoacetate, 1% 1,2-propanediol diacetate, and 19% 1,4-butanediol diacetate.
(f) No detectable amount of monoacetates.

From the Table it can be seen that the product diols using the process of the present invention are acetate free.

It should, of course, be apparent to those skilled in the art that changes may be made in the particular embodiments of the invention described which are within the full intended scope of the invention as defined by the appended claims.

What is claimed is:

1. A continuous process for the production of an ester-free diol from a diol ester by alcoholysis in the presence of an acidic ion exchange material which comprises continually feeding the diol ester comprising a butanediol acetate and a lower alkanol vapor into a reactor, passing said feed materials countercurrently in the reactor, contacting the diol ester and alkanol vapor in the reactor, then flowing a mixture of the diol ester and alkanol through an acidic cationic exchange material in a reaction zone at elevated temperature, then contacting this reaction mixture with additional alkanol vapor thereby removing an ester whose boiling point is lower than the diol ester, then flowing the mixture through an acidic ion exchange material in a reaction zone, repeating the steps of contacting the reaction mixture with additional alkanol vapor and flowing the mixture through an acidic cationic exchange material and then continually removing the ester-free diol and a mixture of starting alkanol and an ester whose boiling point is lower than that of the diol ester from the tower; the amount of alkanol used being about 1 mole to about 25 moles per mole of diol ester.

2. The process of claim 1 wherein the diol ester comprises in admixture the acetate esters of butanediols and propanediol.

3. The process of claim 1 wherein the ester-free diol comprises in admixture 1,4-butanediol, 1,2-butanediol and 2-methyl-1,3-propanediol.

4. The process of claim 1 wherein the acidic cationic exchange material is an acidic cationic exchange resin.

5. The process of claim 1 wherein the acidic cationic exchange resin comprises a sulfonated polystyrene copolymer insoluble in the reaction medium.

6. In an improved process for de-esterifying a mixture comprising an acetate ester of a butanediol and an acetate ester of a propanediol obtained by the hydroformylation and hydrogenation of allyl acetate wherein the improvement comprises continuously feeding said mixture of an acetate ester of a butanediol and an acetate ester of a propanediol into a tower containing an acidic cationic exchange resin from the upper part of said tower and methanol vapor from the lower part of said tower, passing the feed materials countercurrently in the tower, contacting the mixture of acetate esters of diols and methanol vapor in the tower, then flowing a mixture comprising acetate esters of diols and methanol through an acidic cationic exchange resin in a reaction zone at an elevated temperature, then contacting the reaction mixture with additional methanol vapor thereby removing methyl acetate, then flowing the mixture through an acidic cationic exchange resin in a reaction zone, repeating the steps of contacting the reaction mixture with additional methanol vapor and flowing the mixture through an acidic cationic exchange resin and then continually removing an admixture of diols from the lower part of the tower and a mixture of methanol and methyl acetate from the upper part of the tower; the amount of methanol used being about 1 mole to about 25 moles per mole of acetate ester.

7. The process of claim 6 wherein the acidic cationic exchange resin comprises a sulfonated polystyrene copolymer insoluble in the reaction medium.

8. The process of claim 7 wherein the sulfonated polystyrene copolymer is a sulfonated styrene-divinylbenzene copolymer.

* * * * *